United States Patent [19]

Maguire et al.

[11] 3,905,607

[45] Sept. 16, 1975

[54] FACE-TYPE SEALING RING WITH INNER SEAL BAND

[75] Inventors: Roy L. Maguire, Edelstein; Bernard F. Kupfert, Peoria; Gerald E. Whitehurst, East Peoria, all of Ill.

[73] Assignee: Caterpillar Tractor Co., Peoria, Ill.

[22] Filed: Feb. 8, 1974

[21] Appl. No.: 440,648

[52] U.S. Cl. .................................. 277/92; 277/96 A
[51] Int. Cl.² ........................................... F16J 15/34
[58] Field of Search ...................... 277/92, 96 A, 95

[56] References Cited
UNITED STATES PATENTS

| | | |
|---|---|---|
| 2,590,759 | 3/1952 | Dale et al. .............................. 277/92 |
| 2,710,206 | 6/1955 | Huber ..................................... 277/92 |
| 2,858,149 | 10/1958 | Laser ................................. 277/96 A |
| 2,910,313 | 10/1959 | LaBour ............................... 277/96 A |
| 3,024,048 | 3/1962 | Kobert ................................ 277/38 X |
| 3,392,984 | 7/1968 | Reinsma et al. ....................... 277/92 |
| 3,540,743 | 11/1970 | Ashton .................................. 277/92 |
| 3,623,737 | 11/1971 | Eckert .................................. 277/92 |

*Primary Examiner*—Samuel B. Rothberg
*Attorney, Agent, or Firm*—Phillips, Moore, Weissenberger, Lempio & Strabala

[57] ABSTRACT

A two piece metal ring seal is provided with a seal face at the inner diameter of the ring members to reduce surface velocity at the seal face and to reduce ultimate seal size. A single biasing ring is employed in order to further reduce the size of the seal.

12 Claims, 4 Drawing Figures

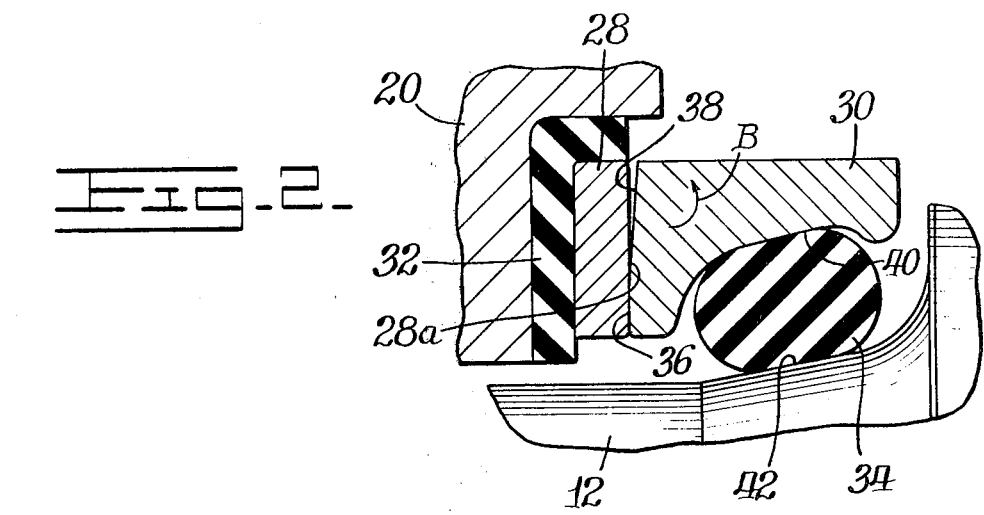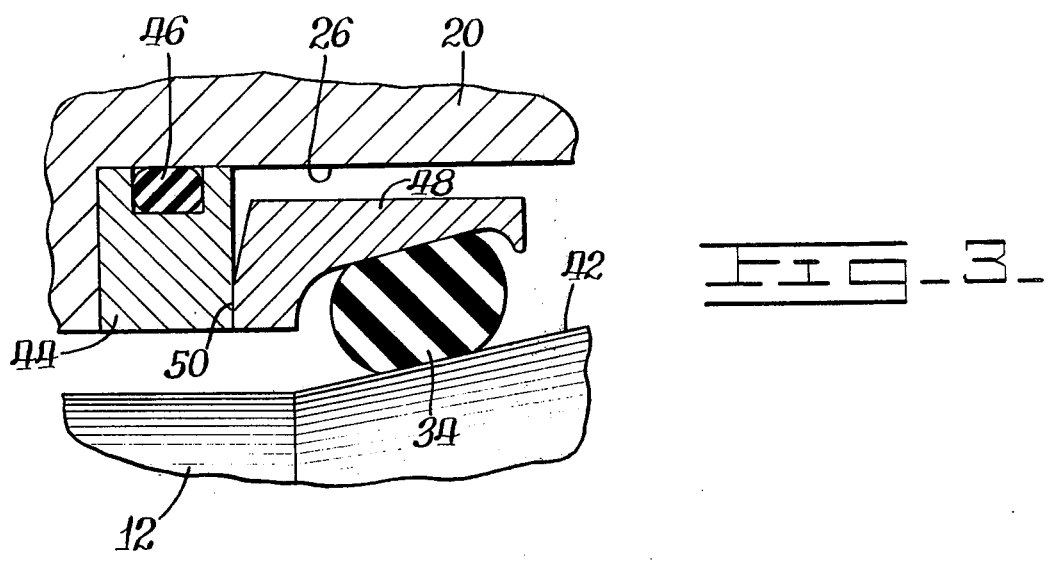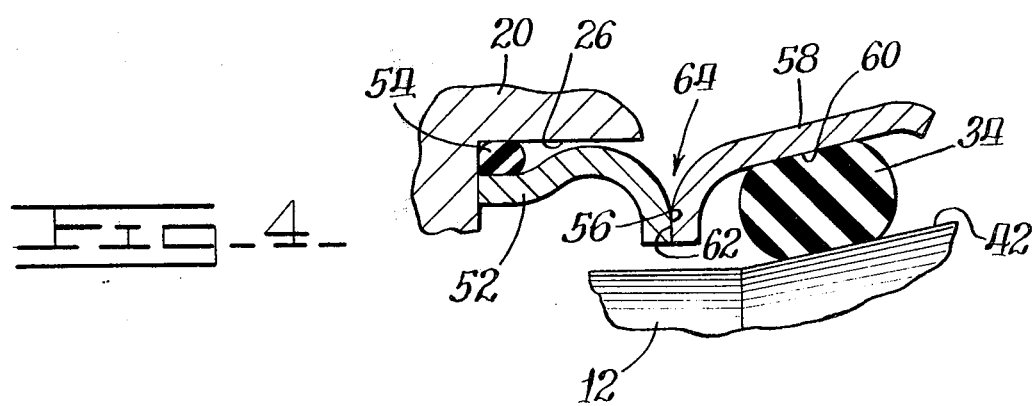

FACE-TYPE SEALING RING WITH INNER SEAL BAND

BACKGROUND OF THE INVENTION

The present invention relates to seals and pertains particularly to metal face seals for track rollers for crawler tractors and the like.

The present invention has particular application to track rollers of track-type tractors. The problem of short bearing life in track rollers and track pins of crawler tractors is one that has continuously plagued the industry for some time. Such tractors typically operate in environments that are highly destructive to seals and consequently to the underlying bearing.

One approach to this problem is the type seal disclosed in U.S. Pat. No. 3,180,648 issued Apr. 27, 1965 Kupfert, et al. and assigned to the assignee hereof. This type metal seal and subsequent improvements have greatly improved track roller bearing life.

The prior art is exemplified by the following U.S. Patents:

| NO. | INVENTOR | DATE |
| --- | --- | --- |
| 2,710,206 | M. W. Huber | June 7, 1955 |
| 3,073,657 | R. V. Oxford | January 15, 1963 |
| 3,110,097 | R. W. Yocum | November 12, 1963 |
| 3,180,648 | B. F. Kupfert, et al | April 27, 1965 |
| 3,392,984 | H. L. Reinsma, et al | July 16, 1968 |
| 3,449,024 | C. L. Lichte | June 10, 1969 |
| 3,452,995 | F. S. Engelking | July 1, 1969 |
| 3,515,446 | R. L. Maguire | June 2, 1970 |
| 3,540,743 | E. J. Ashton, et al | November 17, 1970 |
| 3,572,452 | D. F. Winberg | March 30, 1971 |
| 3,623,737 | E. J. Eckert | November 30, 1971 |
| 3,761,145 | P. W. Schumacher, Jr. | September 25, 1973 |

These seals, while satisfactory for the normal operation of the average track-type vehicle, are found to have some drawbacks when applied to large high speed track vehicles. For example, when the seal diameter gets large, the surface velocity at the seal face increases, increasing heat and centrifugal force problems.

Another problem of these prior art seals is that the arrangement is such that the effects of dirt and grit on the seal face are increased by the normal expansion and contraction of the seal rings in response to heat generated therein by the friction of normal operation. The expansion of the rings at the seal face causes them to separate near the outer diameter, permitting grit to enter the space between the rings and grind away the face of the rings.

Still another problem of these seals is the complexity of the structure necessary for the mounting and proper functioning of the seal. This complexity became necessary in order to provide the inclined ramp for the O-ring, provide mounting and retaining means, and to provide a labyrinth path for greater exclusion of particles of dirt and debris.

SUMMARY AND OBJECTS OF THE INVENTION

In accordance with the present invention a compact seal arrangement is provided by providing loading means on a single ring of a dual ring seal. Seal life is improved by placing the seal band adjacent the innermost diameter of the seal rings and placing the innermost diameter at the dirt side of the seal assembly.

The primary object of the present invention is to provide a simple and inexpensive seal that overcomes the aforementioned problems of the prior art.

A further object of the invention is to provide a compact seal that is rugged and possesses long life.

BRIEF DESCRIPTION OF THE DRAWINGS

The above and other objects and advantages of the present invention will become apparent from the following description when read in conjunction with the accompanying drawings wherein:

FIG. 2 is an enlarged fragmentary view in section of a portion of the embodiment in FIG. 1;

FIG. 3 is a view like FIG. 2 of an alternate embodiment; and,

FIG. 4 is a view like FIG. 2 of another embodiment.

DETAILED DESCRIPTION OF PREFERRED EMBODIMENT

Figure 1:
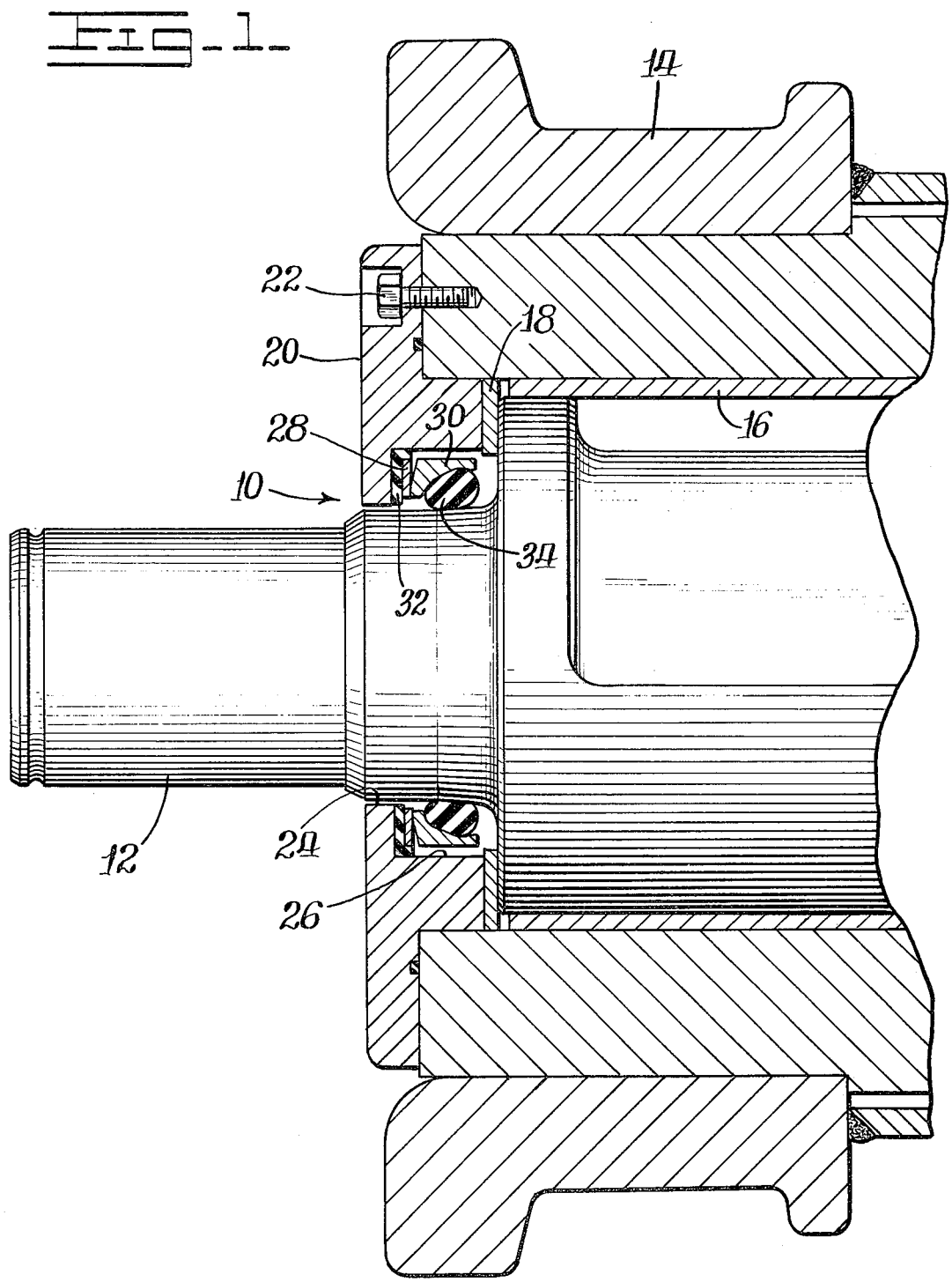
FIG. 1 is an elevational view in section of a portion of a track roller incorporating a seal in accordance with the present invention.

With reference to the drawing and particularly to FIG. 1, there is illustrated a seal assembly generally designated by the numeral 10 constructed in accordance with the present invention and shown incorporated in a track roller assembly of a crawler type tractor. Only one end of the track roller, which is generally symetrical, is shown, and comprises a shaft 12 which is generally stationary and secured to a pair of side rails and on which is mounted a roller 14. A sleeve bearing 16 rotatably journals the roller 14 on the enlarged portion at the center of the shaft 12. End loads on the roller 14 are transmitted to the shaft by means of thrust bearings 18 held in place by an end plate or cap 20 secured as by means of bolts 22 to the end of the roller 14.

The end plate 20 includes a bore 24 through which the shaft 12 extends for mounting of the roller 14 on the shaft 12. The seal assembly functions to seal the bearing cavity area defined by the bore of the roller 14 and end plate 20 against the entrance therein of dirt and other contaminants by way of the bore or opening provided by bore 24. The cavity within the bore of roller 14 normally contains a lubricant in a fluid state which is confined therein by means of the seal assembly 10. Thus, the seal assembly 10 is effective to prevent the escape of oil and lubricant from the chamber and to prevent the entrance of dirt and similar particle matter into the bearing area.

The seal assembly 10 is mounted within a counterbore 26 formed in end plate 20 and concentric with bore 24 and shaft 12. The seal itself comprises a first ring member 28 and a second ring member 30 mounted respectively by suitable mounting means within plate 20 and on shaft 12. The mounting means for the two ring members include a pair of annular resilient members 32 and 34 for mounting or securing the respective rings to the respective member.

As best seen in FIG. 2, the one seal member 28 is simply a simple flat washer having radially directed annular faces that are parallel. The seal face is preferably lapped flat to a smooth finish. The second ring member 30 is of a configuration to define a narrow band seal face at the inner face thereof and the inner diameter indicated at 36 with the upper portion or outer radial portion of the face 38 sloping away therefrom to define a V-shaped space between the outer portion of the seal members 28 and 30. The seal members 28 and 30 are therefore constructed and arranged to define a seal arrangement wherein there is defined a narrow band seal at the inner diameter thereof.

The mounting means for the ring 30 includes a pair of converging conical surfaces 40 and 42 formed respectively on the inner diameter of ring seal member 30 and the outer diameter of the shaft 12. The toric ring or annular resilient member 34 is confined between these two surfaces and because of the configuration thereof, operates to bias the seal member 30 axially along the shaft 12 toward and into sealing engagement with the first seal member 28.

This resilient mounting for the seal ring members 28 and 30 permits a certain degree or misalignment of the shaft and the roller member of other elements of the assembly and permits the seal members to maintain a sealing engagement.

The seal rings 28 and 30 are preferably of a ferrous alloy casting having a lapped sealing area. The ring 28 is constructed to have a lapped flat inwardly facing surface 28a. The ring 30 has a very significant taper at the outer diameter at 38 and a slight taper at the sealing face or zone 36. The relieved area at 38 is preferably tapered in the order of two degrees which provides a wedge area open to the lubricant contained within the roller cavity. The seal zone 36 provides a much narrower wedge preferably being lapped very closely to a range of 0° 1 minute to 0° 2 minutes. In this embodiment, the ring 30 is lightly loaded by O-ring 34 against the rotating ring 28.

The heat generated due to the metal contact of the inner periphery of the rubbing surfaces at 36 is less than prior art constructions where the band is located on the outer periphery because the velocity of the sealing surface of the present invention is much lower. Heat generated in the metal ring 30 in combination with loading of the ring 34 causes the section of the ring 30 to distort as shown by arrow B. This operational distortion and the action of abrasive particles on the inner periphery of the seal causes a relatively narrow seal band (not shown) to be operationally developed within the inner periphery of the seal zone 36. The increasing wear of the contiguous faces of the rings causes the seal band to move progressively outward in a self-generating manner.

The seal arrangement provides a very economical construction in mounting within the counterbore while at the same time providing a seal capable of adapting to the wide range of constructions and providing desirable seal face loads. Also, the shaft 12 may be extruded or otherwise formed with the integral ramp 42 in a fairly economical manner. The location of the seal band in the inner periphery also minimizes heat generation at high speeds in high speed rollers that are normally increasingly used today.

Referring to FIG. 3 wherein like elements are identified by like numbers, a ring member 44 is mounted within counterbore 26 and sealed by means of an O-ring 46. A second ring 48 constructed very similarly to ring 30 in FIGS. 1 and 2, but having a much narrower radial profile, is mounted as in the previous embodiment with a seal face band 50 in engagement with the face of ring 44. This construction provides a more radially compact arrangement than that of the previous embodiment.

Referring now to FIG. 4, a further embodiment is illustrated wherein again like elements are identified by like numbers. In this embodiment, the sealing assembly comprises a first annular seal ring 52 constructed of rolled sheet metal and is sealingly supported by means of a resilient O-ring 54 within counterbore 26. The seal ring member 52 defines an axially extending flange body portion with a narrow band face portion 56 defined at the inner end and inner periphery thereof. A second ring seal member 58 is similarly constructed of a rolled sheet steel construction and is suitably formed to define a converging ramp portion 60 along the inner bore thereof, and a narrow band seal face 62 at the innermost diameter thereof engaging the corresponding seal lip 56 of the other ring 52. This construction provides a very inexpensive construction as well as radially compact construction. Additionally, this construction provides a wider V band spacing area 64 between the seal members.

While the present invention has been described with respect to the preferred embodiments, it is to be understood that numerous changes and modifications may be made therein without departing from the spirit and scope of the invention as defined in the appended claims.

We claim:

1. An axially and radially compact seal assembly for relatively rotatable members, comprising:
   a pair of small section metal seal rings having means defining axially disposed seal faces disposed at the innermost minimum diameter of each of said rings engaged in sealing contact;
   one of said seal faces having means defining a narrow seal band at the innermost minimum diameter thereof;
   first mounting means securing one of said rings to one of said members;
   second mounting means securing the other of said rings to the other of said members;
   one of said mounting means including loading means for applying a face load to said seal rings; and,
   said loading means including a pair of opposed convergent conical ramps and a resilient O-ring compressed between the ramps.

2. The seal assembly of claim 1 wherein one of said ramps is formed in one of said rings; and,
   the other of said ramps is formed on one of said relatively rotatable members.

3. The seal of claim 2 wherein one of said seal rings is of a flat annular construction having opposite radial faces.

4. The seal assembly of claim 2 wherein said ramp is formed on the inner diameter of said one seal member.

5. The seal assembly of claim 2 wherein said seal member having said ramp formed therein is shaped to define said seal band at the inner diameter thereof; and,
   the other of said seal rings is of a flat annular configuration having opposite radial faces.

6. The seal assembly of claim 4 wherein both of said seal rings are constructed of sheet metal; and,
   both of said rings are shaped to provide means defining a radially extending narrow sealing band at the inner diameter thereof.

7. The seal assembly of claim 1 wherein the mounting means for both of said rings include an annular resilient member.

8. The seal assembly of claim 2 wherein said seal assembly is constructed and mounted for exclusion of foreign matter at the inner diameter thereof.

9. The seal assembly of claim 8 wherein one of said relatively rotatable members is a stationary shaft having one of said conical ramps formed integrally therewith; and, the other of said relatively rotatable members is a track roller having a counterbore concentric with said shaft for mounting one of said seal rings.

10. An axially and radially compact seal assembly for a track roller having a stationary shaft with a conical ramp formed integrally thereon and a rotatable member mounted on the shaft, comprising:

a first ring having a substantially axially inwardly facing seal surface formed at the minimum diameter of said ring;

mounting means for sealingly securing said first ring to the rotatable member;

a second ring having a substantially axially outwardly facing narrow band seal surface formed at the minimum diameter of said ring and a conical ramp formed internally thereof; and a resilient annular ring compressibly disposed intermediate said conical ramp of the shaft and said conical ramp of said second ring for axially biasing said outwardly facing seal surface of said second ring against said inwardly facing seal surface of said first ring.

11. The axially and radially compact seal assembly of claim 10 wherein said rotatable member includes an inwardly facing counterbore; and said mounting means for said first ring includes an annular resilient member disposed intermediate said counterbore and said first ring for sealingly seating it within said rotatable member.

12. The axially and radially compact seal assembly of claim 11 wherein said first and second rings are constructed of sheet metal; and said first and second rings are shaped to provide means for defining a radially extending narrow sealing band at the inner diameter thereof relatively closely adjacent said shaft so that the relative surface velocity therebetween is at a minimum.

* * * * *